United States Patent
Peyre

(10) Patent No.: US 6,374,699 B1
(45) Date of Patent: Apr. 23, 2002

(54) AUTOMATIC CYCLE PEDAL

(75) Inventor: Henri Peyre, Saint Benin d'Azy (FR)

(73) Assignee: Look Cycle Internationale, Nevers (FR)

(*) Notice: Subject to any disclaimer, the term of this patent is extended or adjusted under 35 U.S.C. 154(b) by 0 days.

(21) Appl. No.: 09/489,335

(22) Filed: Jan. 21, 2000

(30) Foreign Application Priority Data

Jan. 22, 1999 (FR) ............................................ 99 00722

(51) Int. Cl.⁷ ................................................. G05G 1/14
(52) U.S. Cl. ..................................................... 74/594.6
(58) Field of Search ........................... 74/594.6, 594.4; 36/131

(56) References Cited

U.S. PATENT DOCUMENTS 5,497,680 A    3/1996  Nagano
5,522,282 A  * 6/1996  Nagano ..................... 74/594.6

FOREIGN PATENT DOCUMENTS

FR   2 695 902    3/1994
GB   2 202 499    9/1988

* cited by examiner

Primary Examiner—David A. Bucci
Assistant Examiner—Chong H. Kim
(74) Attorney, Agent, or Firm—Young & Thompson

(57) ABSTRACT

A cycle pedal includes a front engagement member to engage the front end (12) of a locking member (4) secured to the sole of a shoe and a rear male movable engagement member to engage a female rear end (11) of the locking member. The movable engagement member is prestressed by a resilient member toward an engagement position whilst being movable under the pressure of the cyclist's shoe toward an open spaced position permitting insertion or withdrawal of the locking element (4). The front end (12) of the locking member (4) has a female configuration (17) adapted to receive a male configuration of the front engagement member of the automatic pedal, such that the front and rear female ends (17, 14) of the locking member will be pinched between the front and rear male engagement members of the automatic pedal.

10 Claims, 5 Drawing Sheets

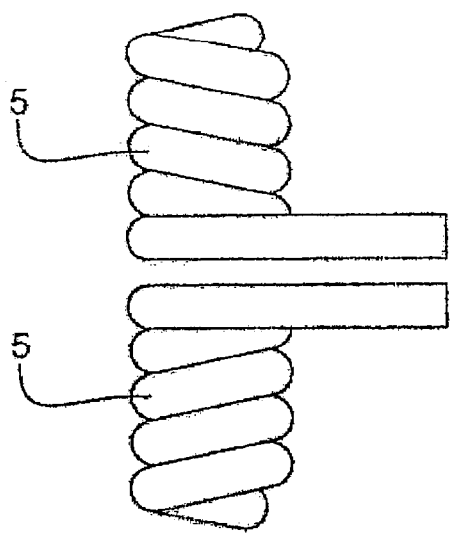
FIG. 10
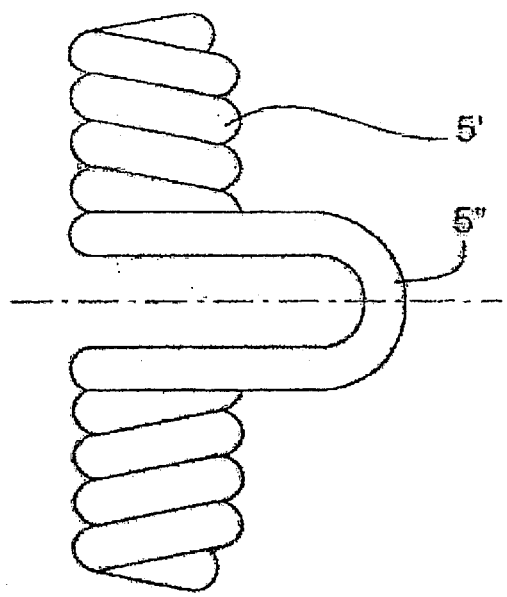
FIG. 11
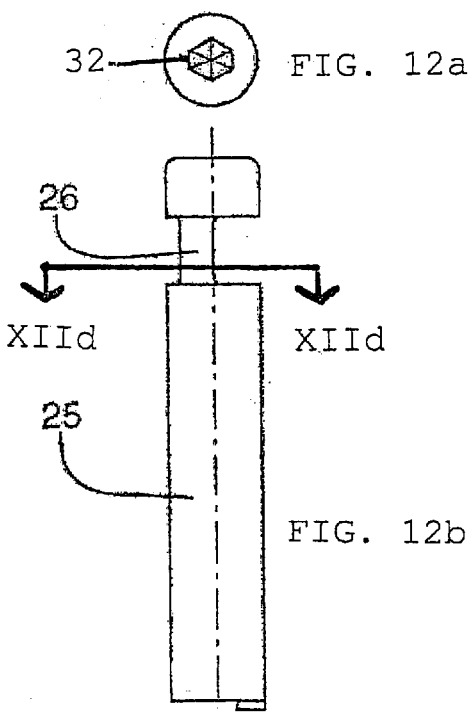
FIG. 12a
FIG. 12b
FIG. 12c
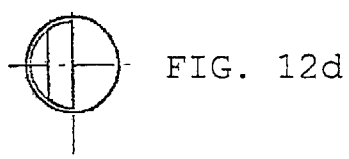
FIG. 12d

AUTOMATIC CYCLE PEDAL

BACKGROUND OF THE INVENTION

The present invention relates to an automatic pedal that can be used on street cycles as well as all terrain cycles.

It also relates to a securement element fixed below the cyclist's shoe and adapted to coact with engagement members disposed on the pedal.

There are known automatic cycle pedals of this type, comprising a front engagement member constituted by a hook forming an abutment to engage a front male end of a locking member in the form of a plate generally embedded in the sole of a cyclist's shoe, and a rear male engagement member constituted by a movable hook to engage a rear female end of the locking member.

On known pedals of this type, a male configuration at the front end of the locking plate is thus received in a female configuration of the front engagement member of the pedal. Two guide members in the form of tongues extending essentially perpendicularly to a reception surface of the locking plate on the pedal are disposed on opposite sides of the front engagement member forming a V to guide the male configuration of the locking plate during emplacement of the latter in a pre-engagement position against the front and rear engagement members of the pedal.

The rear hook is pivotally mounted on an axle and is prestressed by resilient means toward an engagement member whilst being movable against the pressure of the cyclist's shoe between an open spaced position permitting insertion of the locking plate between the two hooks and a closed engagement position ensuring securement of the chock with the automatic pedal.

The resilient means are generally constituted by a helicoidal spring and the rear hook can be forcibly moved against the action of the spring, toward its open position to disengage the locking plate from its grip between the hooks. This movement of the rear hook is obtained with the help of the rear end of the locking plate whose female configuration has oblique sidewalls forming cams which, during rotation of the shoe outwardly, presses back the hook rearwardly. This movement of the rear hook toward the open position can moreover be obtained in the same manner during rotation of the shoe inwardly, for example if the cyclist takes a fall. The spring tension can in general be adjusted with an adjustment screw to modify the force necessary to disengage the shoe.

During rotation of the shoe, the male configuration at the front end of the locking plate also comes laterally against one or the other of the two guide members, with the result that the center of rotation is set back on the plate and that the lever arm is substantially less than the length of the chock.

SUMMARY OF THE INVENTION

An object of the invention is to provide a pedal which permits reducing the number of pieces by omitting the guide and bearing members which are present on known pedals.

Another object of the invention is to provide an automatic pedal which will be particularly simple and less difficult to make while remaining safe and reliable.

Still another object of the invention is to provide a pedal provided with a simplified adjustment member for modifying the spring tension which determines the force of engagement and release of the chock on the pedal.

An object of the invention is an automatic cycle pedal, of the type comprising a front engagement member to engage the front end of a locking element secured to the sole of a cyclist's shoe and a rear movable male engagement member to engage a rear female end of said locking member, said rear movable engagement member being prestressed by resilient means toward an engagement position whilst being movable under the pressure of the cyclist's shoe, against the force of the resilient means, between an open spaced position permitting insertion and withdrawal of the locking member between the two engagement members and a closed engagement position ensuring the securement of the locking member with the automatic pedal, characterized in that the front end of the locking member has a female configuration provided by a recess adapted to receive a male configuration formed by the end of the front engagement member of the automatic pedal, such that the front and rear female elements of said locking member will be pinched between the front and rear male engagement members of the automatic pedal, and in that the front female end of said locking member will have two front guide jaws disposed on opposite sides of the female configuration and adapted to guide the front male engagement member toward this female configuration.

According to other characteristics of the invention:
  the lateral dimensions of the front and rear engagement members are less than those of the female configurations of the locking member, so as to permit a certain lateral clearance of this latter;
  the rear engagement member is prestressed forwardly by an adjustable resilient means and the adjustable resilient means comprises at least one helicoidal spring bearing on an eccentric carried by an adjustment rod permitting adjusting tension of said helicoidal spring by rotation of the rod;
  the eccentric is comprised by a partial recess of the adjustment rod;
  the automatic pedal body is made of synthetic non-metallic material;
  the pedal is a reversible pedal comprising two engaging surfaces.

Another object of the invention is a locking member for a shoe on an automatic cycle pedal, constituting a single piece adapted to be fixed below the shoe, of the type comprising a front end and a rear end adapted to coact respectively with a front engagement member of an automatic cycle pedal to engage the front end of the locking member fixed below the shoe, and a movable rear engagement member of an automatic cycle pedal to engage the rear end of said element, characterized in that the front and rear ends of said element are ends with a female configuration adapted to be pinched between the front and rear male engagement members of an automatic pedal, the front female end of said locking element having two front guide jaws disposed on opposite sides of the female configuration and adapted to guide the front male engagement member toward this female configuration.

According to another characteristic of the invention:
  the front female end of said locking member has a recess adapted to be engaged below the front male engagement member of an automatic pedal.

BRIEF DESCRIPTION OF THE DRAWINGS

Other characteristics and advantages of the invention will become apparent from the description given by way of non-limiting example, of an embodiment of the invention, with reference to the accompanying drawings. In the drawings:

FIG. 10 shows two helicoidal springs adapted to coact with the eccentric axle of FIGS. 12 and 13;

FIG. 11 is a modification with a single spring comprising an intermediate loop,

FIGS. 12a–d show an axle provided with an eccentric according to the invention, FIG. 12a being a top view, FIG. 12b being a side view, FIG. 12c being the side view rotated 90, and FIG. 2d being a cross-sectional view of the eccentric.

DESCRIPTION OF THE PREFERRED EMBODIMENTS

Figure 1:
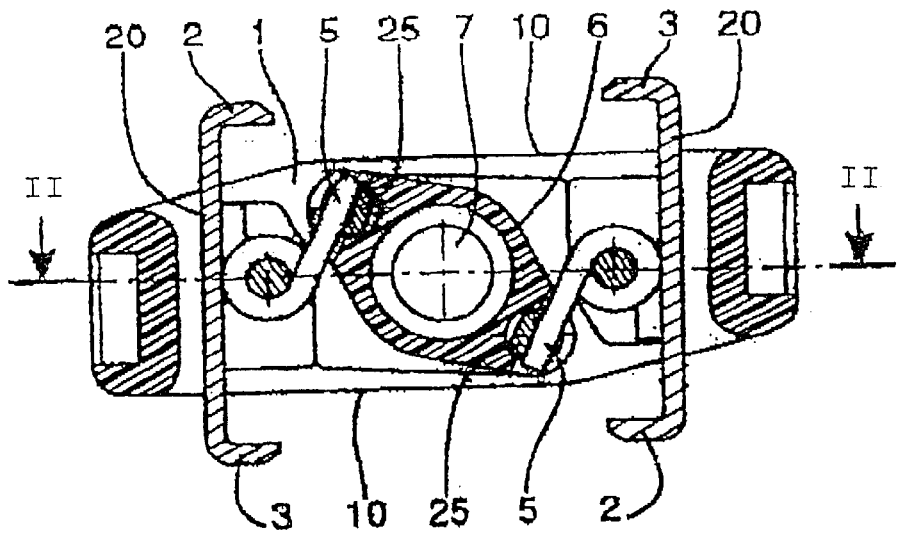
FIG. 1 is a cross-sectional view on the line I—I of FIG. 2 of a reversible pedal according to the invention.
Figure 2:
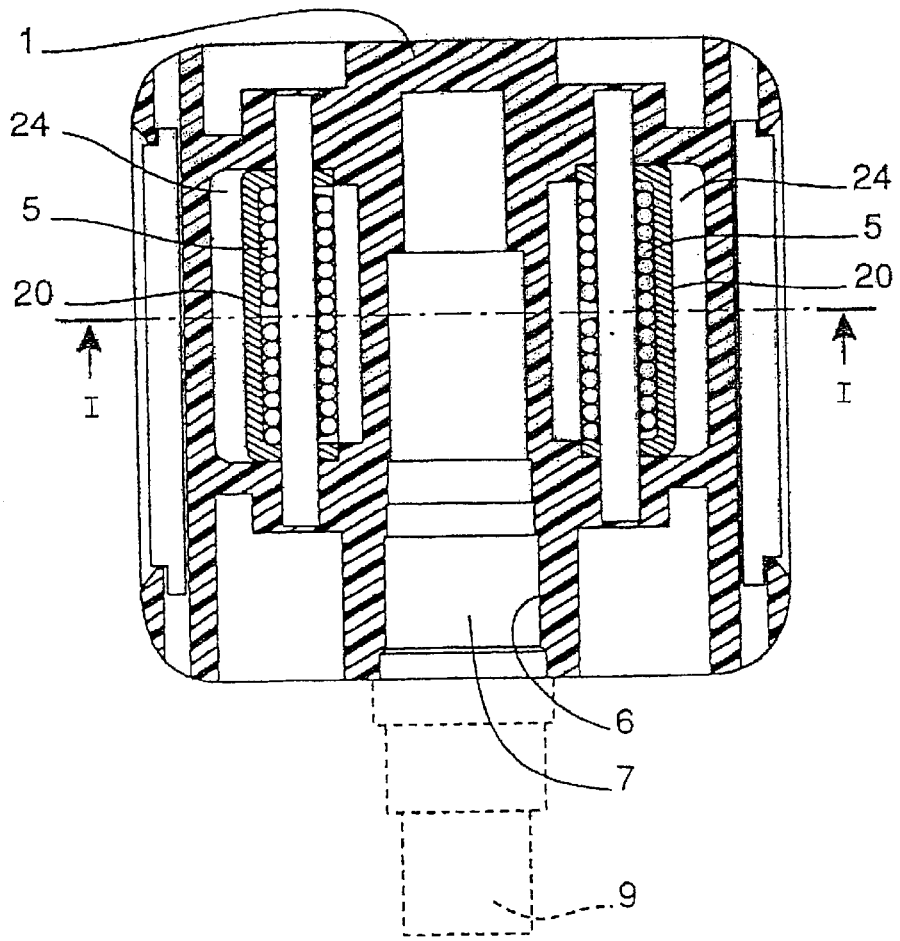
FIG. 2 is a cross-sectional view on the line II—II of FIG. 1.

FIGS. 1 and 2 show an embodiment of the automatic pedal according to the invention. In the illustrated example, this pedal is reversible, which is to say that it comprises two engagement surfaces. This pedal comprises a pedal body 1 having a front engagement member 2 and a rear engagement member 3 which, according to the invention, are both male members adapted to coact with female configurations on locking plate 4 which will be described in detail with reference to FIGS. 3 and 4.

The rear engagement member 3 is in a manner known per se movable between an open space position permitting insertion and retraction of the locking plate 4, and a closed engagement position ensuring the securement of the locking plate with the pedal. The rear engagement member is continuously urged toward the closed engagement position by resilient means constituted by at least one helicoidal spring 5. The tension of this spring can be modified with the help of an adjustment device according to the invention which will be described below in detail.

The pedal body 1 is provided with a median side hole 6 in which the pedal axle 7 is disposed. The free end 9 of this pedal axle, which projects beyond the pedal body 1, is screw-threaded for ultimate mounting of the pedal on the pedal crank of a bicycle.

The two engagement surfaces 10 are opposite each other on the pedal body 1, which preferably can be made of a non-metallic synthetic material, for example of Delrin® (trademark of DUPONT DE NEMOURS) or like material. To facilitate production, the pedal body is preferably molded of a single piece in which the screw-threaded hole for reception of the pedal axle can be obtained directly by molding.

Figure 3:
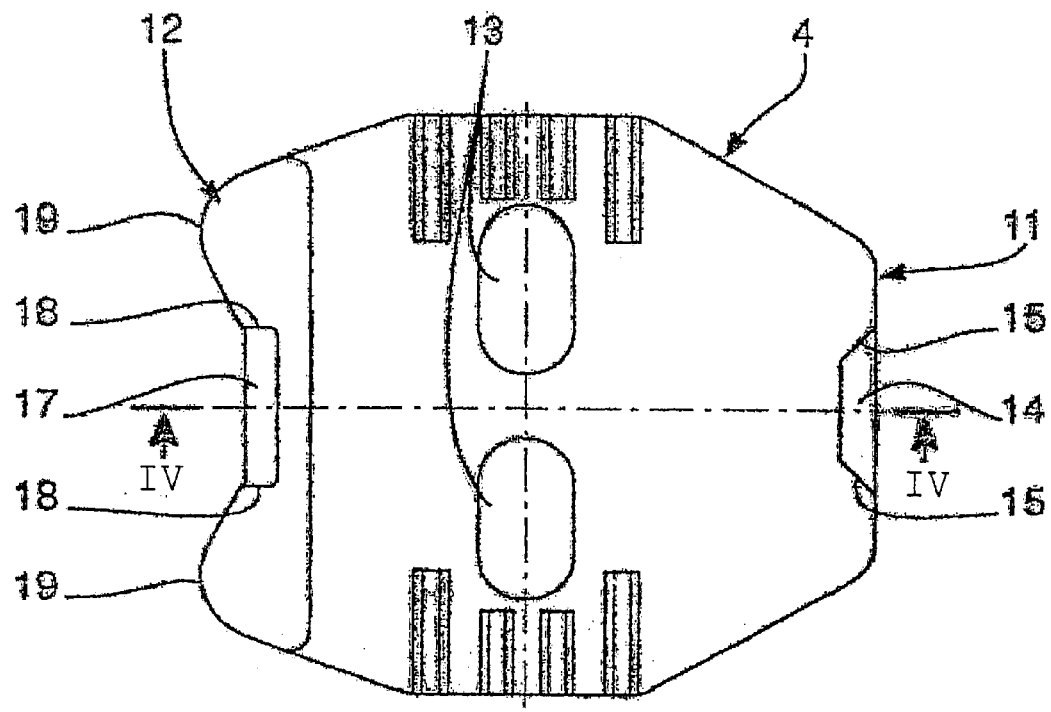
FIG. 3 is a top plan view of the chock forming a locking element according to the invention.
Figure 4:
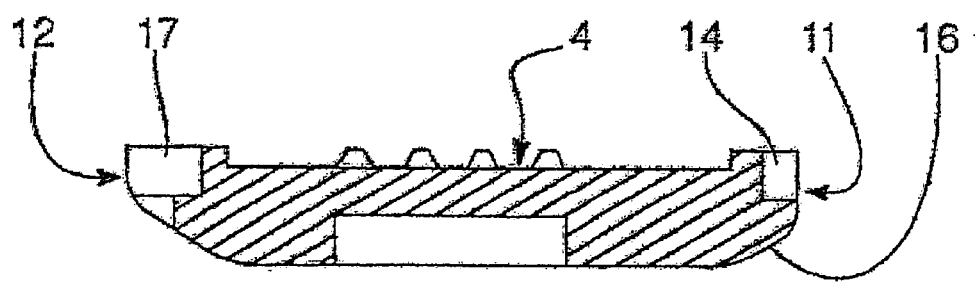
FIG. 4 is a cross-sectional view of the chock on the line IV—IV of FIG. 3.
Figure 5:
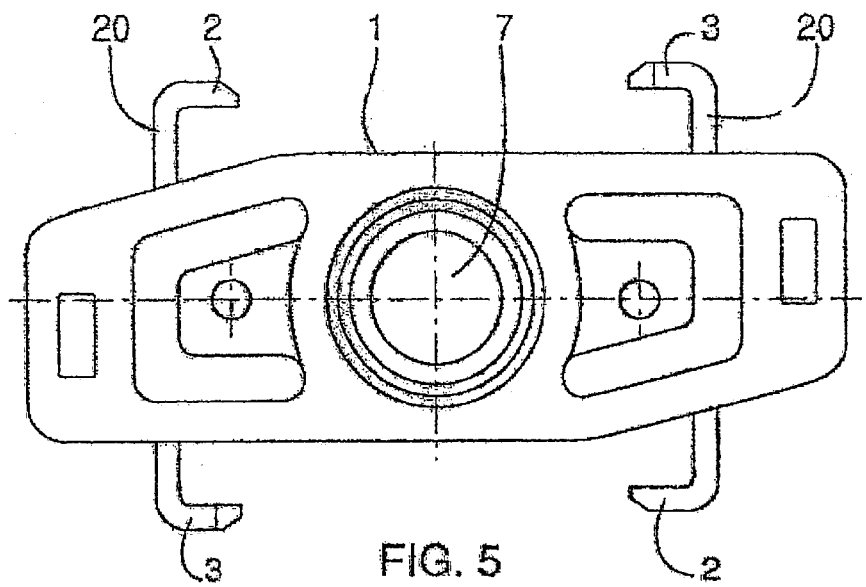
FIG. 5 is a side view of the pedal according to the invention.

The locking plate 4 shown in FIGS. 3 and 4 can be obtained by stamping or sintering.

This locking plate 4 comprises a rear end 11 and a front end 12 adapted to coact respectively with the rear engagement member 3 and the front engagement member of the pedal. The plate also comprises two oblong securement holes 13 for the embedded securement of the plate in the sole of a cyclist's shoe. Of course, these two oblong holes could be replaced by a single slot.

The rear end 11 has a conventional female configuration obtained by a recess 14 which, when the locking plate is fixed against the sole of a cyclist's shoe, forms a cavity for receiving the end of the rear engagement member 3. The sidewalls 15 of this recess form between an obtuse angle whose summit is directed forwardly. These oblique walls constitute cams coacting with the external surfaces of the end of the engagement member, these surfaces forming substantially the same obtuse angle as that of the sidewalls 15 of the recess.

The engagement member can thus be pressed back toward its open spaced position when the cyclist's foot pivots outwardly or inwardly. Preferably a certain play exists between the oblique walls of the recess 14 and the external contact surfaces on the rear engagement member 3, such that a slight lateral clearance of the plate will be possible.

Similarly, the locking plate 4 comprises in its front lower portion an oblique end surface which can be slightly rounded, constituting a cam to press back the engagement member toward its open position, when, to introduce the plate between the engagement members, a pressure is exerted on the plate in a direction perpendicular to the engagement surface 10 in question.

According to the invention, the front end of the locking plate 4 has a female configuration obtained by a recess 17 which, when the locking plate is fixed against the sole of a cyclist's shoe, forms a cavity for the reception of the end of the front engagement member 2, which is immovable. The female front end has a front recess adapted to be engaged below the male front engagement member 2 of the pedal. The sidewalls 18 of this recess are substantially parallel to each other, but can if desired diverge slightly outwardly.

The front jaws 19 are disposed on opposite sides of the recess 17 to serve as guide cams to guide the end of the front engagement member 2 of the pedal toward the female configuration of the locking plate during emplacement of this latter on the engagement surface 10 in question.

The width of the end of the front engagement member 2 of the pedal is slightly less than that of the recess 17 forming the front female configuration, such that a slight play will be created, to permit a certain lateral clearance of the locking plate 4.

Figure 8:
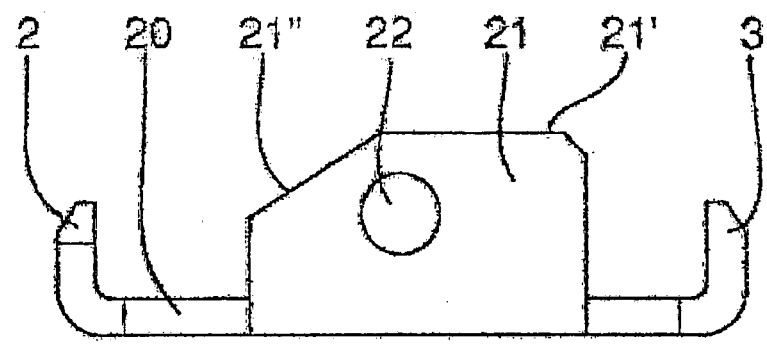
FIGS. 7 to 9 are different views of a lever carrying the front and rear engagement members.
Figures 7, 9:
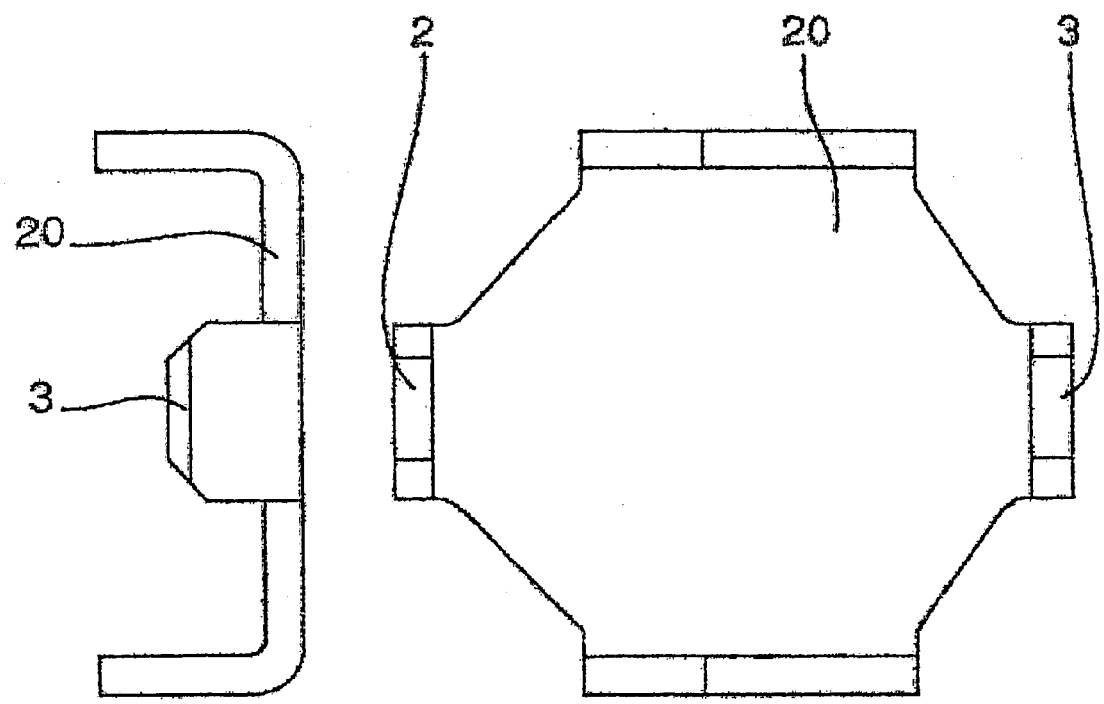

As already mentioned, the pedal is in the illustrated example a reversible pedal and it preferably comprises two metallic levers 20 (see FIGS. 8 and 9), of which each carries a front engagement member 2 and a rear engagement member 3, these engagement members being constituted by projections bent to about 90° relative to the plane of the lever.

On its lateral sides, each lever 20 comprises portions bent in the same direction as the engagement members 2, 3, so as to form opposite tongues 21, each tongue being provided with a hole 22 receiving a rotation axle 23 (see FIG. 2) of the lever 20.

These levers 20 extend parallel to the axle 7 of the pedal through transverse oblong openings 24 provided in the pedal body, such that the engagement members project on opposite sides of the latter on each engagement surface 10. Each lever 20 is pivotally mounted about a respective rotation axle 23 and is prestressed toward the approach and closure position of the front and rear engagement members 2, 3 by a helicoidal spring 5 which surrounds the rotation axle 23 and which on the one hand bears against the lever 20 and on the other hand against a fixed point on the pedal body.

In this closed position, the external edge 21' of each tongue 21 of the lever 20 is in abutment against the pedal body. The corner 21" of this edge of the side of this front disengaging member is cut out to permit limited rotation of the lever toward the spaced position of the engagement members from each other.

The pedal is provided with a device for adjusting the tension of the spring 5. This adjustment device comprises a cylindrical adjustment rod 25 (see FIGS. 1, 12a–d) embedded in the material of the pedal 1 and extending parallel to the rotation axle 23, between the latter and the pedal axle 7. The rod is, according to the invention, provided with an eccentric 26 on which the spring 5 bears, through an opening 27 provided in the pedal body 1, on the side of the oblong opening 24. The eccentric 26 is provided by a partial recess forming a flat on the adjustment rod 25. One of the ends of the adjustment rod is accessible from outside the pedal body through a hole provided in this latter and this end is provided with a central recess 32 with six sides adapted to receive a key permitting turning the rod 25 by several degrees so as to adjust the tension in the spring 5.

Figure 6:
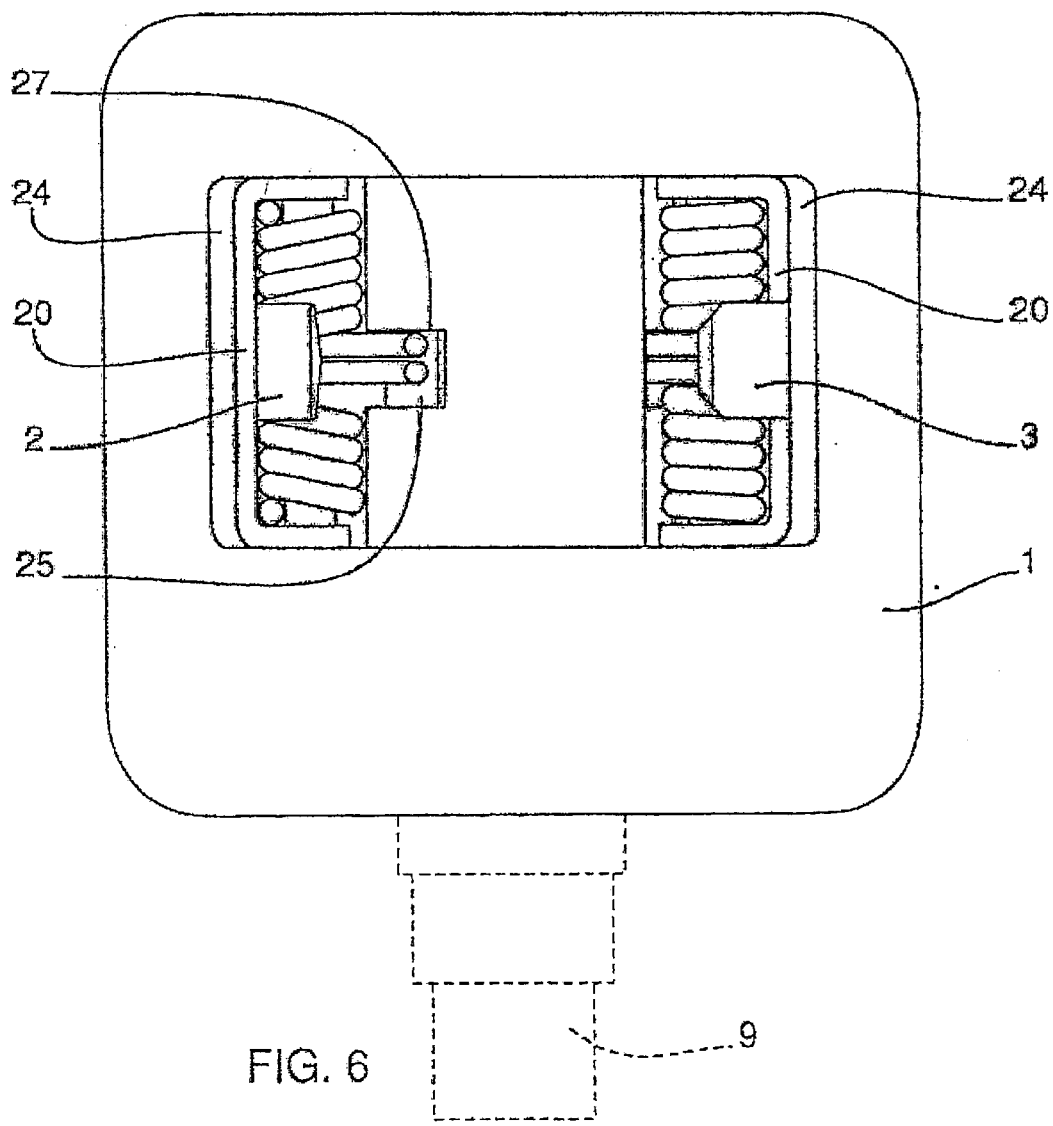
FIG. 6 is a top plan view of the pedal; this view corresponds to the bottom view of this same pedal because it is reversible.

In the example shown in FIGS. 2 and 6, two springs 5 such as those shown in FIG. 10 surround each rotation axle of the lever 20, their ends being juxtaposed to remain together in the recess 26 forming an eccentric.

According to the modification shown in FIG. 11, a single helicoidal spring 5' is used. This spring 5' is in its central portion provided with a loop 5" adapted to be disposed in the recess 26 forming an eccentric of the adjustment rod 25.

There is thus obtained a pedal which is particularly simple to make, very reliable and whose spring tension is particularly simple to adjust. It also permits a certain lateral clearance of the plate, whilst the pivot point of the locking plate is, relative to the case in which the known device is, displaced forwardly to obtain a longer lever arm, which permits use of pieces of less hardness.

What is claimed is:

1. An automatic cycle pedal, comprising:

a front engagement member (2) to engage a front end (12) of a locking member (4) secured to the sole of a cyclist's shoe and a rear movable male engagement member (3) to engage a rear female end (11) of said locking member (4), said rear movable engagement member (3) being prestressed by resilient means (5) toward an engagement position whilst being movable under the pressure of the cyclist's shoe, against the action of the resilient means, between an open spaced position permitting insertion and withdrawal of the locking member (4) between the two engagement members (2, 3) and a closed engagement position ensuring the securement of the locking member (4) with the automatic pedal, wherein the front end (12) of the locking member (4) has a female configuration provided by a recess (17) adapted to be engaged below a male configuration formed by the end of the front engagement member (2) of the automatic pedal, such that the front and rear female ends (11, 12) of said locking member (4) will be pinched between the front and rear male engagement members (2, 3) of the automatic pedal, wherein the front female end (12) of said locking member has two front guide jaws (19) disposed on opposite sides of the recess (17) and adapted to guide the front male engagement member (2) toward the recess, and wherein each of said two front guide jaws (19), in a plan view, has a front-most portion that is nearer a side of said front end (12) than to said recess (17) and has a continuous surface that slopes toward said recess (17) from said front-most portion, whereby said front-most portions and said continuous surfaces of said two front guide jaws form a V-shape with said recess at an apex for guiding the front male engagement member into said recess.

2. The automatic pedal according to claim 1, wherein lateral dimensions of the front and rear engagement members (2, 3) are less than those of the female configurations (14, 17) of the locking member (4) so as to permit a certain lateral clearance of the latter.

3. The automatic pedal according to claim 1, in which the rear engagement member (3) is prestressed forwardly by said resilient means (5), and wherein said resilient means comprises at least one helicoidal spring (5, 51) bearing on an eccentric (26) carried by an adjustment rod (25) permitting adjusting the tension of said helicoidal spring (5) by rotation of said adjustment rod.

4. The automatic pedal according to claim 1, wherein the body (1) of the automatic pedal is made of a non-metallic synthetic material.

5. The automatic pedal according to claim 1, wherein the pedal is a reversible pedal comprising two engagement surfaces (10).

6. A locking member for securing a shoe on an automatic cycle pedal, comprising:

a single piece adapted to be fixed below the shoe and having a front end (12) and a rear end (11) adapted to coact respectively with a front engagement member (2) of the automatic cycle pedal to engage the front end (12) of the locking member (4) fixed below the shoe and a movable rear engagement member (3) of the automatic cycle pedal to engage the rear end (11) of said locking member, wherein the front and rear ends (12, 11) of said locking member are ends with a female configuration adapted to be pinched between the front and rear male engagement members (2, 3) of the automatic pedal, the female configuration of said front end being provided by a recess (17) adapted to be engaged below the front engagement member of the automatic cycle pedal, the front female end (12) of said locking member having two front guide jaws (19) disposed on opposite sides of the recess (17) and adapted to guide the front male engagement member (2) toward the recess (17), and wherein each of said two front guide jaws (19), in a plan view, has a front-most portion that is nearer a side of said single piece than to said recess (17) and has a continuous surface that slopes toward said recess (17) from said front-most portion, whereby said front-most portions and said continuous surfaces of said two front guide jaws form a V-shape with said recess at an apex for guiding the front male engagement member into said recess.

7. The automatic pedal according to claim 2, in which the rear engagement member (3) is prestressed forwardly by said resilient means (5), wherein said resilient means comprises at least one helicoidal spring (5, 5') bearing on an eccentric (26) carried by an adjustment rod (25) permitting adjustment of the tension of said helicoidal spring (5) by rotation of said adjustment rod.

8. The automatic pedal according to claim 7, wherein the eccentric (26) is provided by a partial recess in the adjustment rod (25).

9. The automatic pedal according to claim 2, wherein said recess (17) has sidewalls (18) that are substantially parallel to each other.

10. An automatic cycle pedal, comprising:

a front engagement member (2) to engage a front end (12) of a locking member (4) secured to the sole of a cyclist's shoe and a rear movable male engagement member (3) to engage a rear female end (11) of said locking member (4), said rear movable engagement member (3) being prestressed forwardly by resilient means (5) toward an engagement position whilst being movable under the pressure of the cyclist's shoe, against the action of the resilient means, between an open spaced position permitting insertion and withdrawal of the locking member (4) between the two engagement members (2, 3) and a closed engagement position ensuring the securement of the locking member (4) with the automatic pedal, wherein the front end (12) of the locking member (4) has a female configuration provided by a recess (17) adapted to be engaged below a male configuration formed by the end of the front engagement member (2) of the automatic pedal, such that the front and rear female ends (11, 12) of said locking member (4) will be pinched between the front and rear male engagement members (2, 3) of the automatic pedal, and wherein the front female end (12) of said locking member has two front guide jaws (19) disposed on opposite sides of the recess (17) and adapted to guide the front male engagement member (2) toward the recess, and wherein said resilient means comprises at least one helicoidal spring (5, 5') bearing on an eccentric (26) carried by an adjustment rod (25) permitting adjusting the tension of said helicoidal spring (5) by rotation of said adjustment rod, wherein the eccentric (26) is provided by a partial recess in the adjustment rod (25).

\* \* \* \* \*